UNITED STATES PATENT OFFICE 2,108,879

4-HYDROXYNAPHTHOSTYRILE COMPOUNDS

Werner Zerweck, Wilhelm Kunze, and Walter Brunner, Frankfort-on-the-Main-Fechenheim, Germany, assignors to General Aniline Works, Inc., New York, N. Y., a corporation of Delaware No Drawing. Application August 12, 1936, Serial No. 95,618. In Germany August 14, 1935

3 Claims. (Cl. 260—124)

Our invention relates to 4-hydroxynaphthostyrile compounds of the general formula

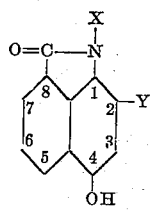

wherein X stands for a member of the group consisting of hydrogen, alkyl, cycloalkyl and aryl of the benzene, diphenyl and naphthalene series, Y for a member of the group consisting of hydrogen and halogen.

The new products are easily obtainable with an excellent yield by heating the mineral acid salts of 4-amino naphthostyrile and of its substitution products at about 150° to 200° C. in the presence of water, whereby the amino group is replaced by the hydroxy group.

4-hydroxynaphthostyrile is not obtainable according to U. S. Patent No. 1,728,995, since the 1-cyannaphthalene-5,8-disulfonic acid cannot be converted into 4-hydroxynaphthostyrile by the action of caustic alkalies at elevated temperatures, such as the 1-cyannaphthalene-4,8-disulfonic acid, which yields in a smooth reaction 5-hydroxynaphthostyrile.

4-aminonaphthostyrile and its nuclear substitution products are easily accessible and the conversion into the corresponding hydroxy compounds as described above can be carried out in a smooth reaction with an excellent yield. The new 4-hydroxynaphthostyrile compounds are therefore easily obtainable valuable intermediates, which may be used for the production of dyestuffs and of pharmaceutical products.

In order to further illustrate our invention the following examples are given, the parts being by weight and all temperatures in centigrade degrees; but it is, however, to be understood that our invention is not limited to the particular products nor reacting conditions mentioned therein.

Example 1

To 182 parts of 4-aminonaphthostyrile, obtainable for instance according to Journ. f. Prakt. Chemie (2), vol. 38, page 181 or by nitrating naphthostyrile in the presence of concentrated sulfuric acid by means of the calculated quantity of nitric acid and by reducing the formed nitroproduct by means of iron and acetic acid, 1200 parts of hydrochloric acid of 3,6% strength are added and the mixture is heated in a closed vessel while stirring for about 3 hours at 175 to 180° C. When cool the separated yellowish brown reaction product is filtered off, some unchanged initial product remaining dissolved. For purification, the separated product may be redissolved in a cold dilute caustic alkali solution, some insoluble impurities may be removed by filtration and from the reddish solution the product is precipitated by the addition of dilute hydrochloric acid. The reaction product for which we assume the formula

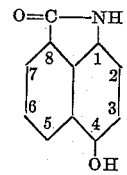

is when dry a brownish yellow powder, which dissolves in a dilute sodium carbonate and caustic alkali solution with a dark red, in alcohol or glacial acetic acid with a yellow color. It is insoluble in benzene and crystallizes from acetic acid as yellow very fine crystals which melt at 278° C. with decomposition. As it appears from the aforesaid properties it is not identical with the product, described in Liebigs Annalen, vol. 477, pages 161–194, to which the authors ascribe the above formula, which product is colorless, soluble in benzene and insoluble in a dilute sodium carbonate solution, melting at 170° C.

By methylating our product the 4-methoxynaphthostyrile is obtained which is when dry greenish yellow crystals of 239 to 240° C. melting point.

The above process may be carried out by replacing the added hydrochloric acid by the corresponding quantity of sulfuric acid.

Example 2

A mixture of 280 parts of the acid sulfate or the corresponding amount of the hydrochloride of 4-aminonaphthostyrile and of 2500 parts of water is heated in an autoclave for 5 hours at 190 to 200° C. When cool the reaction product is isolated. It is identical with the product of Example 1.

In the same manner 4-amino-N-methylnaphthostyrile and 4-amino-N-ethyl-naphthostyrile yield the 4-hydroxy-N-methylnaphthostyrile of 290° C. melting point of the formula

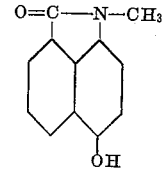

and the 4-hydroxy-N-ethylnaphthostyrile of about 200° C. melting point of the formula

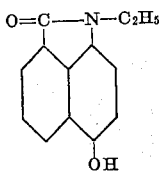

Example 3

A mixture of 260 part of 4-amino-N-phenylnaphthostyrile, about 1500 parts of water and 120 parts of hydrochloric acid of 30% strength is heated at about 200° C. for about 3 hours. When cool the reaction product is filtered off and may be purified by redissolving it in a caustic soda solution and precipitating it again. The N-phenyl-4-hydroxynaphthostyrile of the formula

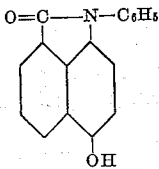

is when dry a yellow product of 248 to 250° C. melting point.

In the same manner other N-aryl-4-hydroxynaphthostyriles are obtainable, for instance the N-(2'-methoxyphenyl)-4-hydroxynaphthostyrile of 129 to 130° C. melting point, the N-(4'-methoxyphenyl)-4-hydroxyphenyl of about 242° C. melting point, the N-(3'-chlorophenyl)-4-hydroxynaphthostyrile of about 272° C. melting point, the N-(4'-chlorophenyl)-4-hydroxynaphthostyrile of about 260° C. melting point, the N-diphenyl-4-hydroxynaphthostyrile of 208 to 210° C. melting point, the N-naphthyl-4-hydroxynaphthostyrile of about 286° C. melting point, the N-cyclohexyl-4-hydroxynaphthostyrile of about 240° C. melting point.

Example 4

A mixture of 220 parts of 4-amino-2-chloronaphthostyrile, about 2000 parts of water and 100 parts of sulfuric acid of 90% strength is heated at about 90° C. for about 4 hours. The reaction product may be purified as described in the foregoing examples. The 4-hydroxy-2-chloronaphthostyrile of the formula

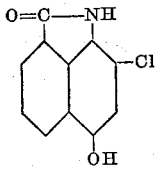

thus formed is when dry a yellowish brown powder soluble in caustic alkalies solutions with a red and in alcohol with a yellow color. It melts when rapidly heated at 375 to 380° C. with decomposition.

In the same manner 2-halogeno-N-alkyl- and -N-phenyl-4-hydroxynaphthostyriles are obtainable, for instance 2-chloro-N-methyl-4-hydroxynaphthostyrile of 286 to 288° C. melting point, 2-bromo-N-methyl-4-hydroxynaphthostyrile, which crystallizes from glacial acetic acid as yellow crystals, of about 308° C. melting point, 2-chloro-N-phenyl-4-hydroxynaphthostyrile of about 304° C. melting point.

We claim:

1. 4-hydroxynaphthostyrile compounds of the general formula:

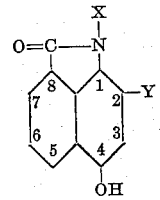

wherein X stands for a member of the group consisting of hydrogen, alkyl, cycloalkyl and aryl of the benzene, diphenyl and naphthalene series, Y for a member of the group consisting of hydrogen and halogen.

2. 4-hydroxynaphthostyrile of the formula:

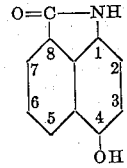

which product is when dry a brownish yellow powder, which dissolves in a dilute sodium carbonate and caustic alkali solution with a dark red, in alcohol and glacial acetic acid with a yellow color, insoluble in benzene, crystallizing from acetic acid as yellow very fine crystals which melt at 278° C. with decomposition, which product is substantially identical with the product obtained by heating a mineral acid salt of 4-aminonaphthostyrile at temperatures of 150 to 200° C. in the presence of water.

3. 2-bromo-N-methyl-4-hydroxynaphthostyrile of the formula:

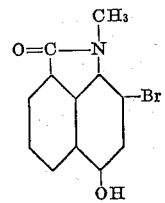

which crystallizes from glacial acetic acid as yellow crystals of about 308° C. melting point.

WERNER ZERWECK.
WILHELM KUNZE.
WALTER BRUNNER.